United States Patent [19]
Cohen

[11] 3,809,428
[45] May 7, 1974

[54] SUN VISOR ACCESSORY
[76] Inventor: Eli Cohen, 350 Continental Ave., Paramus, N.J.
[22] Filed: June 1, 1972
[21] Appl. No.: 258,853

[52] U.S. Cl. ............................. 296/97 C, 224/29 A
[51] Int. Cl. ............................................. B60j 3/00
[58] Field of Search ............. 296/97 C, 97 H, 97 R; 224/29 A, 26 F; 160/DIG. 3; 206/19.5 R, DIG. 6

[56] References Cited
UNITED STATES PATENTS
3,670,933 6/1972 Jones................................ 224/26 F
2,486,096 10/1949 Axford et al....................... 296/97 C
2,453,843 11/1948 Hanson............................. 296/97 C
3,026,999 3/1962 Constantino...................... 224/29 A Primary Examiner—David Schonberg
Assistant Examiner—John A. Pekar
Attorney, Agent, or Firm—Frank P. Cyr

[57] ABSTRACT

A stretchable, tubular sleeve-like member provided with means thereon for the reception of various often used articles or objects and which is adapted to be mounted on the sun visor of a motor vehicle to thereby render such articles or objects easily accessible to the driver or passenger of a motor vehicle.

2 Claims, 4 Drawing Figures

PATENTED MAY 7 1974 3,809,428

3,809,428

SUN VISOR ACCESSORY

BACKGROUND OF THE INVENTION

As is well known, all motor vehicles, whether they be passenger automobile, truck, bus or the like, are provided with a sun visor for the driver of the vehicle and also quite frequently, a similar sun visor is provided on the passenger side thereof. As can be appreciated, the various automobile manufacturers have not been overly concerned with the size of such visors, the result being that each car manufacturer installs a visor of his choosing. Thus, there is the resultant condition that the visors installed in a vehicle are of differing sizes in width, length, etc. Also, some visors are provided with a padding; whereas, others are not. As can readily be seen, the thickness of such visors may vary from one type visor to another.

In the past, various type visor accessories have been provided for attachment to a sun visor of a vehicle and such accessories have, in some instances, pockets or other article-receiving portions formed therein for the reception of various articles frequently used by the driver or passenger of the vehicle. These articles may be in the nature of personal items such as a comb, nail file, etc., or articles which are normally carried in one's billfold, such as a gasoline credit card, driver's license, toll tickets, etc., and since the sun visor is placed immediately in front of the driver or passenger, the same forms an ideal support for mounting an accessory for the reception of the aforesaid articles. However, as stated previously, since there is no uniformity in the sizes of the visors employed by the various automobile manufacturers, the sun visor accessory must, of necessity, be constructed in various sizes in order to permit the same to be installed on the visor for the aforesaid purposes.

With the above in mind, it is the main object of the invention to provide an accessory for mounting on a sun visor of a vehicle which will enable the same to be mounted on visors of various sizes or dimensions and to be frictionally retained thereon by the inherent elasticity of the material employed for forming the accessory.

Another object of the invention is to form an article-retaining accessory of a suitable knit material so as to enable the same to be economically manufactured and yet capable of being mounted on various size sun visors and retained thereon without the use of any extraneous fastener means such as straps, buttons, etc.

Another object of the invention is to form an article-retaining accessory with a plurality of article-receiving pockets or openings, whereby articles frequently used by a driver or passenger of a vehicle may be conveniently stored, yet, readily accessible when needed.

Another object of the invention is to form a sun visor accessory of an inexpensive material, yet, capable of receiving thereon various announcements, advertisements, company logos, etc., whereby the same may be conveniently, and yet inexpensively, employed for advertising a product of one distributing such accessories to the purchasing public.

Novel features which are believed to be characteristic of the present invention, both as to its organization and method of operation, together with further objects and advantages thereof, will be better understood from the following description, considered in connection with the accompanying drawing, in which a presently preferred embodiment of the invention is illustrated by way of example. It is to be expressly understood, however, that the drawing is for the purpose of illustration and description only, and is not intended as a definition of the limits of the invention.

DESCRIPTION OF THE PREFERRED EMBODIMENTS

Figure 1:
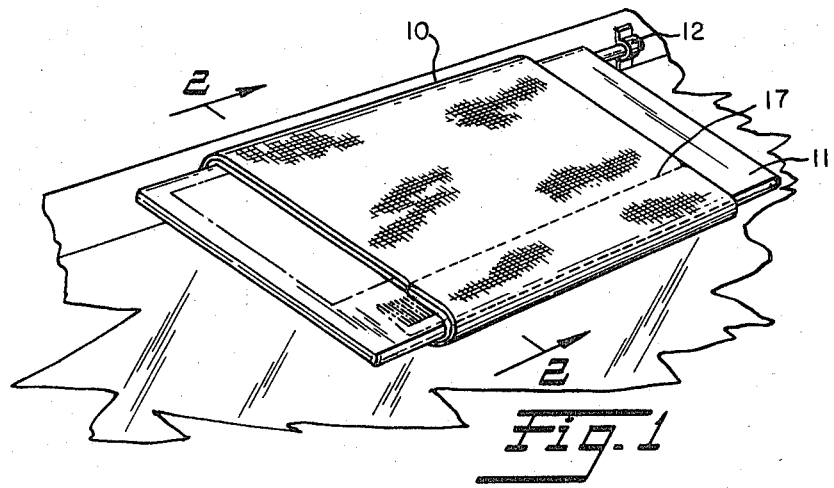
FIG. 1 is a perspective view showing a sun visor accessory made in accordance with the present invention, applied to the sun visor of a vehicle.

Referring now to the drawings, there is shown therein at 10, a sun visor accessory made in accordance with the present invention. The accessory 10 may be in the nature of a sleeve-like tubular knitted material which will have the inherent characteristic of being stretchable, thus enabling the same to be applied to varying size sun visors and to be retained thereon solely by friction between the stretched fabric material and the sun visor per se. The sun visor is shown at 11, and may be constructed in any known manner, and is usually rectangular in shape, although the shape and/or design of the visor forms no part of the present invention. The visor is pivotally mounted, as at 12, to the surface immediately adjacent the conventional windshield of a vehicle and is intended to function in its intended manner.

Figure 2:
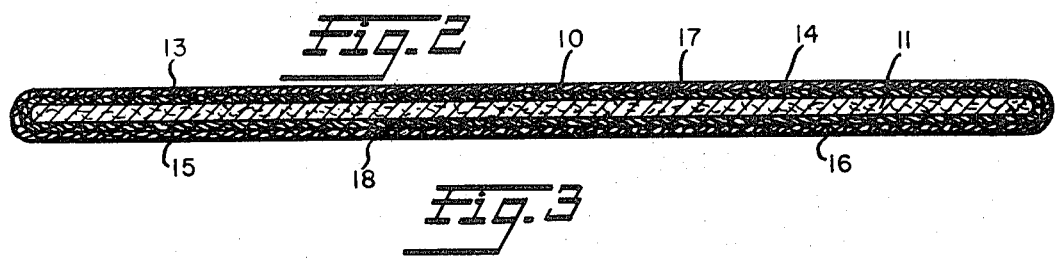
FIG. 2 is a section taken on line 2—2 of FIG. 1, looking in the direction of the arrows.

Shown in FIG. 2 of the drawings, is a two-ply arrangement of fabrics with pockets 13, 14, 15 and 16 forming article receiving areas extending throughout the width of the tubular knitted fabric, formed by parallel lines of stitching 17 and 18, extending between the aforesaid ply arrangement. The stitching lines 17 and 18 extend throughout the full width of the tubular fabric as shown more clearly in FIGS. 1, 3, and 4 of the drawings. However, the ends of the tubular knitted structure are left unsecured so as to afford an opening at both sides of the sleeve to provide access into the article receiving areas for the placement of articles therein from either side thereof.

The accessory is preferably formed of a knitted fabric so as to enable the same to be economically manufactured and yet capable of performing its intended function.

In instances where, for any known reason, it is more economically feasible to omit one of the plies of the material in the formation of the accessory, it is obvious the same may be constructed of but one single ply of a knitted tubular material, and the same applied over a sun visor surface with an article-receiving or storing area formed between the inner walls of the tubular material and the surfaces of the sun visor.

Figure 3:
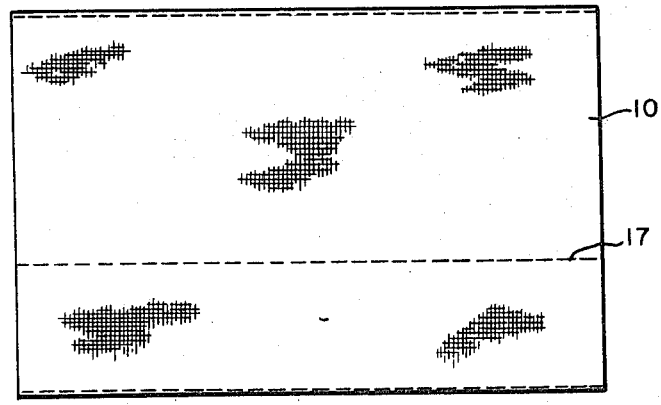
FIG. 3 is a front elevation of the accessory.
Figure 4:
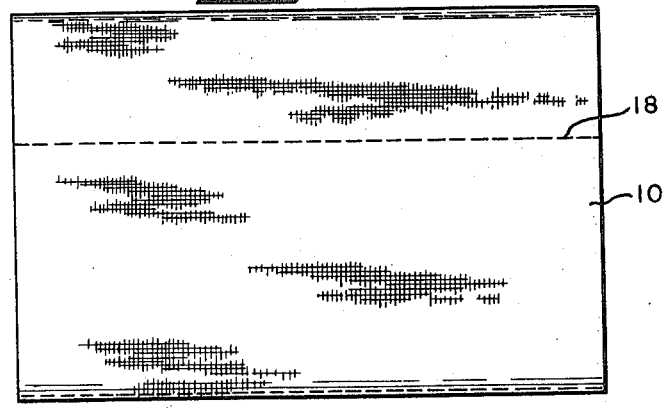
FIG. 4 is a rear elevational view of the accessory.

Shown in FIGS. 2, 3 and 4, is an accessory constructed of a two-ply arrangement of a knitted material. However, as can be appreciated, while four pockets or openings are formed between the plies by the aforesaid lines of stitching which extend throughout the full width of the tubular knitted material, if additional pockets are desired, additional lines of stitching may be provided for forming the additional pockets. Also, if desired, the accessory may be made of more than two plies of knitted fabric with stitch lines extending thereacross to provide more material or object-receiving openings, thus increasing the storage capacity of the accessory.

It is also conceivable that the accessory may be made of a single ply of a knitted tubular member by overlapping one edge of the tubular member over the other edge thereof and to secure the same in overlapped relationship as by parallel lines of stitching to thus unite the parts together and to simultaneously form an article-receiving pocket or opening at this portion of the accessory.

The accessory, as described above, has been referred to as a structure formed of a knitted tubular formation of one or more plies of material, with stitch lines in multi-ply arrangements where it is desired to form article-receiving portions or pockets. A knitted tubular structure is preferably more desirable than the employment of other materials since the same will enable the accessory to be constructed very economically and the material has the natural inherency of being stretchable, thus permitting for but one size accessory to be manufactured, yet permitting the same to be applied to any number of differently-sized sun visors.

However, it should be pointed out that the invention is not to be construed as being limited to the employment of a knitted tubular fabric in the formation of the accessory. Other materials can be employed as efficiently as the knitted fabric provided, of course, the same has an inherent elasticity or stretchability so as to enable the same to be applied over differently-sized sun visor constructions.

The accessory, constructed as set forth above, can be economically manufactured and may be of any color arrangement so as to enhance the appearance of the interior of the motor vehicle. The economical manufacture of the same will readily adapt the accessory to be employed in the nature of a give-away item by a manufacturer wishing to promote a product such as a company logo. Additionally, advertising material can easily be incorporated into the tubular structure as the same is being manufactured, thus enabling the accessory to render a double purpose — that of disseminating advertising matter as well as offering a storage means for certain often used items for the driver and/or passengers in a motor vehicle.

From the above description of the invention, it will be seen that there is presented an accessory for the sun visor of a motor vehicle which need only be slipped over a conventional sun visor and the same will be retained thereon solely by reason of the stretchability of the material employed in the formation of the same, thus obviating the need for any extraneous securing means.

While I have shown and described the preferred embodiment of my invention, it will be understood that minor changes in construction, combination and arrangement of parts may be made without departing from the spirit and scope of the invention as claimed.

Having thus described my invention, what I claim is:

1. An accessory for a sun visor of a vehicle comprising a tubular formation structure consisting of a plurality of plies of a material having a sufficient stretchability as to enable the same to be applied over sun visor surfaces of differing sizes and to be retained thereon solely by the friction forces between the said tubular formation and the said sun visor surface, lines of stitching throughout the width of the tubular formation for forming article receiving areas therein, said article receiving areas extending the width of said tubular formation and being open at both ends thereof.

2. The structure recited in claim 1, wherein said article receiving areas extend over the front and rear surfaces of said sun visor.

* * * * *